Aug. 2, 1927.
E. ROWART
1,637,961

DRAWING OF GLASS IN SHEET FORM AND APPARATUS THEREFOR

Filed Feb. 26, 1924   3 Sheets-Sheet 1

Inventor.
Eugène Rowart
By
Rogers, Kennedy Campbell
Attys.

Aug. 2, 1927.

E. ROWART 1,637,961

DRAWING OF GLASS IN SHEET FORM AND APPARATUS THEREFOR

Filed Feb. 26, 1924  3 Sheets-Sheet 3

*Inventor.*
Eugene Rowart
By Rogers, Kennedy Campbell
Attys.

Patented Aug. 2, 1927.

1,637,961

UNITED STATES PATENT OFFICE.

EUGÈNE ROWART, OF AUVELAIS, BELGIUM, ASSIGNOR TO PILKINGTON BROTHERS LIMITED, OF LIVERPOOL, ENGLAND, A LIMITED LIABILITY COMPANY OF GREAT BRITAIN.

DRAWING OF GLASS IN SHEET FORM AND APPARATUS THEREFOR.

Application filed February 26, 1924, Serial No. 695,254, and in Belgium March 5, 1923.

This invention relates to the drawing of glass in sheet form and has for its object an improved process and apparatus whereby the sheet is drawn at its full width flat and free from defects.

In drawing a sheet of glass it is necessary to employ some means of overcoming the tendency of the sheet, due to the surface tension of the glass, to diminish in width.

Hitherto known processes directed to this same end, have generally involved:—

1. The use of a refractory piece having a slot of length approximately equal to the width of the sheet, through which issues the glass serving to form the sheet.

2. The intense local cooling either of the glass in the bath at the point of draw of the edges, or of the edges themselves immediately on formation, by mechanical means such as rollers, or 3. The use of refractory pieces immersed in the bath of molten glass, having channels through which flows the glass serving to form the edges.

According to this invention the main body of the sheet is drawn from the free surface of a bath of molten glass in a main pot, which glass is not injuriously affected by any local cooling or by the presence in it of any refractory pieces. The resulting sheet of glass is therefore free from striæ, inequality of thickness and other defects such as are due to the presence of solid bodies or to differences of temperature in the glass.

The width of the sheet is maintained by forming the edges from glass coming from a source independent of the main pot, that is to say, from glass which does not come directly from the main pot, so that its temperature may be regulated to any desired value without affecting the glass in the main pot from which the main body of the sheet is drawn.

In the accompanying drawings which illustrate one form of apparatus designed to carry out this invention:—

Figure 1:
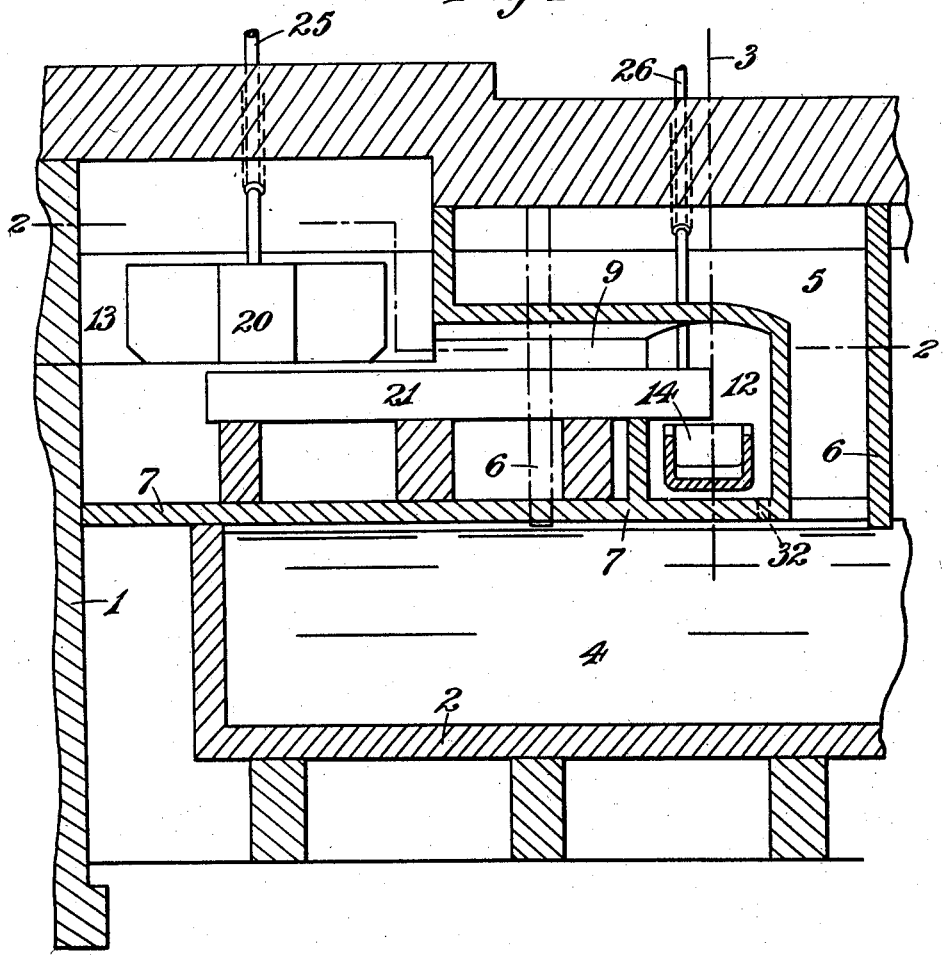
Figure 1 is a vertical section of the apparatus taken at right angles to the plane of the sheet being drawn and along the line 1—1 of Figure 2.
Figure 2:
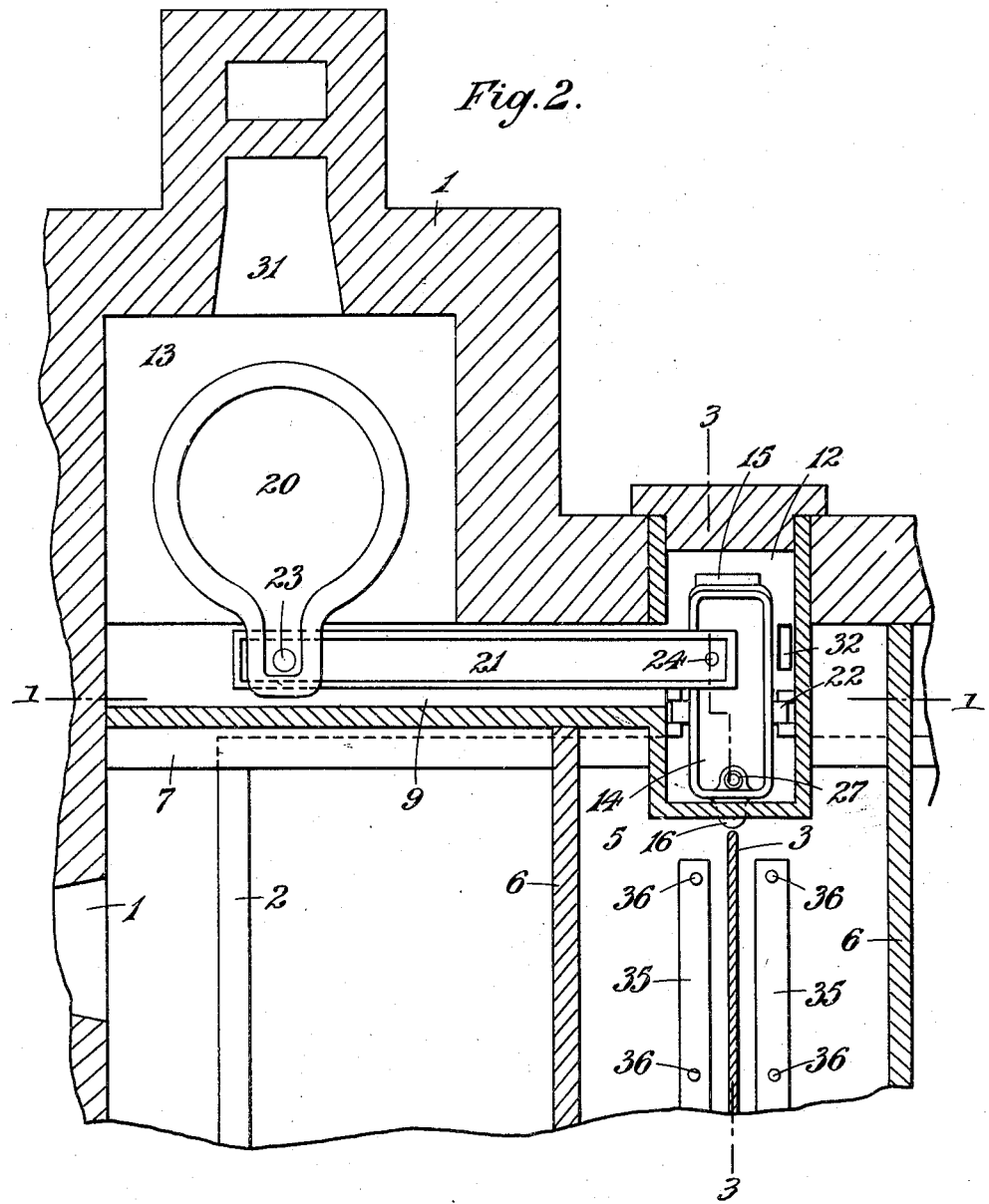
Figure 2 is a horizontal section of part of the same, taken through the line 2—2 of Figure 1.
Figure 3:
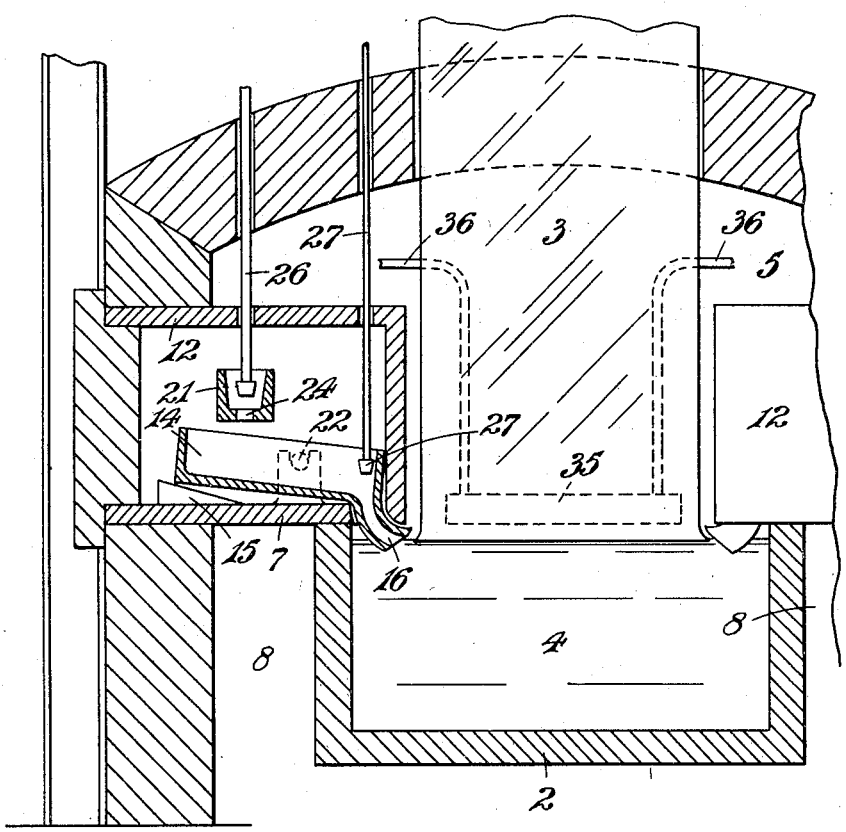
Figure 3 is a part vertical section transverse to the section of Figure 1, and taken along the line 3—3 of Figure 2.

Referring to the drawings, the extension 1 of a tank furnace, surrounds on three sides a pot or conduit 2 which communicates with the glass in the main pot. The glass 4 in the pot 2 is maintained at any desired temperature by gases introduced into the spaces 8.

The sheet 3 (indicated in Figure 1 only by a centre line) is drawn from the glass 4 in the pot 2 in a drawing chamber 5, formed by side walls 6. Two chambers 12 one near each vertical edge of the sheet, communicate each by a passage 9 with a chamber 13, these chambers and passages being heated by burners 31 with outlets 32.

Two large pots 20 respectively communicate by outlets 23 and conduits 21 having outlets 24 with two small pots 14. The pots 14 are pivoted at 22 and adjusted in angular position by wedges 15. They are provided with discharge necks 16, which pass through holes in the floor plates 7 of the chambers 12 and 13 into the drawing chamber 5, and the necks 16 are so located that glass contained in the pots 14, which has a level higher than that of the glass in the pot 2, is discharged close to the surface of, or into, the glass 4 in the pot 2, according to the adjustment of the wedges 15. Valves 25, 26, 27 control the flow of glass from the pots 20 into conduits 21, from these conduits to the pots 14 and from these pots to the discharge necks 16 respectively, and enable the level of the glass in the pots 14 to be maintained at any desired level.

By means of gases introduced through the burners 31 the temperature of the glass in the pots 14 may be maintained at any desired value.

Devices for cooling the main sheet may be employed such as the water cooled boxes 35, with water pipes 36.

The above described apparatus is operated as follows to carry the invention into effect: The pots 14 are charged with glass to a suitable level from the pots 20. A bait is lowered into the main body of glass 4, and then glass is allowed to issue from the discharge necks 16 of the pots 14 and this comes into contact with the two ends of the bait. The bait is then drawn upwards, drawing the main body of the sheet from the glass 4 and the two edges from the glass in the two pots 14.

By the above described process, the glass 4 may be maintained at the temperature best suited to the formation of the main body of the sheet, while the glass in the pots 14 may be maintained at such other temperature as may be best suited to the formation of the edges so that these latter may be able to withstand the tendency of the sheet to contract in width and moreover, to exercise such a lateral tension on the sheet as to maintain it flat.

The invention is not restricted to the apparatus or process hereinbefore described and shown in the drawings: numerous modifications may be adopted, without departing from the invention, in the method of bringing the glass which is to form the edges, to the points of draw of those edges, provided always that it be possible to regulate the temperature of the said glass independently of that of the glass 4 serving to form the main body of the sheet, and that the glass which serves to form the edges, be discharged at, or closely above the surface of, or into, the glass 4.

Having described my invention, I declare that what I claim and desire to secure by Letters Patent is:—

1. The process of drawing glass in sheet form consisting of drawing the main body of the sheet and the edges thereof from respectively independent sources of glass.

2. The process of drawing glass in sheet form consisting of drawing the main body of the sheet from a main pot and the edges thereof from sources of glass of which the temperature can be controlled without affecting that of the glass in the main bath.

3. The process of drawing glass in sheet form consisting of drawing the main body of the sheet and the edges thereof simultaneously from independent sources of glass, the edges and main body becoming united together during said operation.

4. The process of drawing glass in sheet form consisting of drawing the main body of the sheet from a main pot and supplying glass from an independent source to the surface of the main pot at the point of draw of one of the edges of the sheet.

5. The process of drawing glass in sheet form consisting of drawing the main body of the sheet from a main pot and the edges from independent sources in subsidiary pots containing glass at a higher level than that in the main pot.

6. The process of drawing glass in sheet form consisting of drawing the main body of the sheet from a main pot and the edges from independent sources in subsidiary pots containing glass at a variably higher level than that in the main pot.

7. The process of drawing glass in sheet form consisting of drawing the main body of the sheet from a main pot and the edges from independent sources in pots provided with openings through which the glass issues to form the said edges.

8. The process of drawing glass in sheet form consisting of drawing the main body of the sheet from a main pot and the edges from independent sources in pots provided with openings through which the glass issues to form the said edges and pivoted so as to be adapted to vary the level of the said openings.

9. The process of drawing glass in sheet form consisting of drawing the main body of the sheet from a main pot and the edges from independent sources in subsidiary pots provided with heating means which are independent of the heating means for the main pot.

10. Apparatus used in drawing glass into sheet form comprising in combination a main pot containing the glass from which the main body of the sheet is drawn and subsidiary pots containing glass from which is supplied the glass from which the edges of the sheet are drawn.

11. Apparatus according to claim 10 characterized by means for heating the glass in the main pot and means, independent thereof, for heating the glass in the subsidiary pots.

12. Apparatus according to claim 10 characterized by openings in the subsidiary pots through which the glass issues close to the surface of the glass in the main pot and close to the points of draw of the edges of the sheet.

13. In apparatus used in drawing glass into sheet form, the combination with a main pot containing the glass from which the main body of the sheet is drawn, of subsidiary pots containing the glass from which is supplied the glass from which the edges of the sheet are drawn, and cooling devices for the main sheet of glass.

14. In apparatus used in drawing glass into sheet form, the combination with a main pot containing the glass from which the main body of the sheet is drawn and a drawing chamber containing the main pot, of two chambers within the main chamber, a subsidiary pot in each of the two last-named chambers, a discharge neck on each subsidiary pot adapted to supply glass to the surface of the main pot at the point of draw of each edge of the sheet, and sources of glass supply for the subsidiary pots independent of that of the main pot.

15. In apparatus used in drawing glass into sheet form, the combination with a main pot containing the glass from which the main body of the sheet is drawn and a drawing chamber containing the main pot, of two chambers within the main chamber, a subsidiary pot in each of the two last-named chambers, a discharge neck on each subsidiary pot adapted to supply glass to the surface of the main pot at the point of draw of each edge of the sheet, sources of glass supply for the subsidiary pots independent of that of the main pot, and valves adapted to control the passage of glass through the necks.

16. In apparatus used in drawing glass into sheet form, the combination with a main pot containing the glass from which the main body of the sheet is drawn and a drawing chamber containing the main pot, of two chambers within the main chamber, a subsidiary pot in each of the two last-named chambers, a discharge neck on each subsidiary pot adapted to supply glass to the surface of the main pot at the point of draw of each edge of the sheet, sources of glass supply for the subsidiary pots independent of that of the main pot, and valves adapted to control the passage of glass through the necks, and from the sources of glass supply to the subsidiary pots.

17. In apparatus used in drawing glass into sheet form, the combination with a main pot containing the glass from which the main body of the sheet is drawn and a drawing chamber containing the main pot, of two chambers within the main chamber, a subsidiary pot in each of the two last-named chambers, a discharge neck on each subsidiary pot adapted to supply glass to the surface of the main pot at the point of draw of each edge of the sheet, sources of glass supply for the subsidiary pots independent of that of the main pot, valves adapted to control the passage of glass through the necks and from the sources of glass supply to the subsidiary pots and cooling devices for the main sheet of glass.

18. In apparatus used in drawing glass into sheet form, the combination of a main pot containing the glass from which the main body of the sheet is drawn, subsidiary pots containing the glass from which the edges of the sheet are drawn, two large pots containing glass independent of that within the main pot, conduits adapted to receive the glass released from the two large pots and deliver same into the subsidiary pots, and valves controlling the flow of glass respectively from the two large pots to the conduits, from the conduits to the subsidiary pots and from the subsidiary pots to the main pot.

19. In apparatus used in drawing glass into sheet form, the combination of a main pot containing the glass from which the main body of the sheet is drawn, subsidiary pots containing the glass from which the edges of the sheet are drawn, two large pots containing glass independent of that within the main pot, conduits adapted to receive the glass released from the two large pots and deliver same into the subsidiary pots, valves controlling the flow of glass respectively from the large pots to the conduits, from the conduits to the subsidiary pots and from the subsidiary pots to the main pot, heating means for the main pot, and heating means independent of those of the main pot for the subsidiary pots.

20. In apparatus used in drawing glass into sheet form, the combination of a main pot containing the glass from which the main body of the sheet is drawn, subsidiary pots containing the glass from which the edges of the sheet are drawn, two large pots containing glass independent of that within the main pot, conduits adapted to receive the glass released from the two large pots and deliver same into the subsidiary pots, valves controlling the flow of glass respectively from the large pots to the conduits, from the conduits to the subsidiary pots and from the subsidiary pots to the main pot, heating means for the main pot, heating means independent of those of the main pot, for the subsidiary pots, pivots for the subsidiary pots, and means adapted to tilt the subsidiary pots to varying extents.

21. In apparatus used in drawing glass into sheet form, the combination of a main pot containing the glass from which the main body of the sheet is drawn, subsidiary pots containing the glass from which the edges of the sheet are drawn, two large pots containing glass independent of that within the main pot, conduits adapted to receive the glass released from the two large pots and deliver same into the subsidiary pots, valves controlling the flow of glass respectively from the large pots to the conduits, from the conduits to subsidiary pots and from the subsidiary pots to the main pot, heating means for the main pot, heating means independent of those of the main pot, for the subsidiary pots, pivots for the subsidiary pots, means adapted to tilt the subsidiary pots to varying extents and cooling devices for the main sheet of glass.

22. The process of drawing sheet glass, which comprises drawing the main body of the sheet and the two edge portions from separate sources.

23. In a sheet glass drawing apparatus, a source of molten glass, means for drawing the sheet, and a container having a central reservoir from which the main body of the sheet is drawn, and separate side reservoirs from which the sheet edges are drawn.

In testimony whereof I have affixed my signature.

EUGÈNE ROWART.